US012355480B2

(12) United States Patent
Kostas et al.

(10) Patent No.: US 12,355,480 B2
(45) Date of Patent: Jul. 8, 2025

(54) MACHINE LEARNING-BASED RADIO FREQUENCY (RF) FRONT-END CALIBRATION

(71) Applicant: QUALCOMM Incorporated, San Diego, CA (US)

(72) Inventors: Lindsey Makana Kostas, San Diego, CA (US); Rishubh Khurana, Bangalore (IN); Ahmed Youssef, San Diego, CA (US); Francisco Ledesma, Richardson, TX (US); Sergey Murashov, San Diego, CA (US); Viral Ranpara, San Diego, CA (US); Enrique De La Rosa, San Diego, CA (US); Ming Leung, San Diego, CA (US); Gurkanwal Singh Sahota, Rancho Santa Fe, CA (US); Shahnaz Shirazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 18/188,337

(22) Filed: Mar. 22, 2023

(65) Prior Publication Data
US 2023/0254003 A1    Aug. 10, 2023

Related U.S. Application Data

(63) Continuation of application No. 17/650,334, filed on Feb. 8, 2022, now Pat. No. 11,637,582.

(51) Int. Cl.
H04B 1/40        (2015.01)
H04B 17/11       (2015.01)
H04B 17/21       (2015.01)

(52) U.S. Cl.
CPC .............. *H04B 1/40* (2013.01); *H04B 17/11* (2015.01); *H04B 17/22* (2023.05)

(58) Field of Classification Search
CPC ................. H04B 1/40; H04B 17/11
See application file for complete search history.

(56) References Cited

U.S. PATENT DOCUMENTS 7,308,238 B2 *  12/2007  Lee ........................ H03J 7/04
                                                  455/182.2
9,430,595 B2 *   8/2016  Pandey .............. G06F 30/3323
(Continued)

FOREIGN PATENT DOCUMENTS

CN    112862087 A     5/2021
CN    113723438 A    11/2021
(Continued)

OTHER PUBLICATIONS

Andraud M., et al., "One-Shot Non-Intrusive Calibration Against Process Variations for Analog/RF Circuits", IEEE Transactions on Circuits and Systems-I, Regular Papers, IEEE, US, vol. 63, No. 11, Nov. 1, 2016, pp. 2022-2035, XP011626806, ISSN: 1549-8328, DOI: 10.1109/TCSI.2016.2598184, Sections: I, II, III, VII, Abstract.
(Continued)

Primary Examiner — Jaison Joseph
(74) Attorney, Agent, or Firm — Patterson + Sheridan, L.L.P.

(57) ABSTRACT

Certain aspects of the present disclosure provide techniques and apparatus for calibrating radio frequency (RF) circuits using machine learning. One example method generally includes calibrating a first subset of RF circuit calibration parameters. Values are predicted for a second subset of RF circuit calibration parameters based on a machine learning model and the first subset of RF circuit calibration parameters. The second subset of RF circuit calibration parameters may be distinct from the first subset of RF circuit calibration
(Continued)

parameters. At least the first subset of RF circuit calibration parameters is verified, and after the verifying, at least the first subset of RF circuit calibration parameters are written to a memory associated with the RF circuit.

30 Claims, 8 Drawing Sheets

(56) References Cited

U.S. PATENT DOCUMENTS

| | | | |
|---|---|---|---|
| 10,693,578 B1* | 6/2020 | Shapiro | H04H 20/55 |
| 11,029,890 B1* | 6/2021 | Parthasarathy | G11C 16/3495 |
| 11,101,810 B1* | 8/2021 | Veldhoven | H03M 1/0626 |
| 11,416,664 B2* | 8/2022 | Le | G06F 30/367 |
| 11,474,748 B2* | 10/2022 | Parthasarathy | G06F 3/0659 |
| 11,526,693 B1* | 12/2022 | Goldenberg | G06F 18/2431 |
| 11,637,582 B1 | 4/2023 | Kostas | |
| 2018/0260732 A1* | 9/2018 | Bloom | G06N 10/40 |
| 2019/0073603 A1 | 3/2019 | Johansson et al. | |
| 2021/0314073 A1* | 10/2021 | Wang | H04B 17/11 |
| 2022/0374768 A1* | 11/2022 | Takeshima | G06V 10/82 |
| 2023/0254003 A1* | 8/2023 | Kostas | H04B 17/3913 |
| | | | 370/329 |

FOREIGN PATENT DOCUMENTS

| | | |
|---|---|---|
| JP | 2022508319 A | 1/2022 |
| WO | 2021004725 A1 | 1/2021 |
| WO | 2021050664 A1 | 3/2021 |

OTHER PUBLICATIONS

International Search Report and Written Opinion—PCT/US2023/060194—ISA/EPO—Apr. 28, 2023.

* cited by examiner

MACHINE LEARNING-BASED RADIO FREQUENCY (RF) FRONT-END CALIBRATION

CROSS-REFERENCE TO RELATED APPLICATIONS

This application is a continuation of U.S. patent application Ser. No. 17/650,334, entitled "Machine Learning-Based Radio Frequency (RF) Front-End Calibration," filed Feb. 8, 2022, and assigned to the assignee hereof, the entire contents of which are hereby incorporated by reference.

INTRODUCTION

Aspects of the present disclosure relate to radio frequency (RF) circuit calibration.

Radio frequency circuits generally allow for signaling to be converted to and from a radio frequency bandwidth for transmission to other devices or processing of signaling received from other devices. These RF circuits are generally fabricated as a set of electronic circuits that form a complete unit. Because of variations in the fabrication process, however, the properties of each RF circuit may vary. Thus, to allow for these RF circuits to perform at a similar level, each RF circuit may be individually calibrated, and the parameters with which each RF circuit is calibrated may be written to a memory associated with the RF circuit.

The complexity involved in calibrating RF circuits generally increases as these RF circuits are designed to support new functionality. For example, RF circuits may be calibrated for operations in various frequency bands (e.g., the FR1 band between 4.1 GHz and 7.125 GHz, the FR2 band between 24.25 GHz and 52.6 GHz, etc.), operations using a single antenna or using multiple antennas in multiple-input-multiple-output (MIMO) systems, or the like. For RF systems that implement MIMO techniques or allow for communications using millimeter wave frequencies, the number of uplinks and downlinks within the system may further increase the number of parameters to be calibrated. Thus, as RF circuits become more complex, and as the number of configuration parameters for these RF circuits increases, the process of calibrating RF circuits may become increasingly resource-intensive.

Accordingly, what is needed are techniques for efficiently calibrating parameters of RF circuits.

BRIEF SUMMARY

Certain aspects provide a method for calibrating a radio frequency (RF) circuit. The method generally includes calibrating a first subset of RF circuit calibration parameters. Values are predicted for a second subset of RF circuit calibration parameters based on a machine learning model and the first subset of RF circuit calibration parameters. The second subset of RF circuit calibration parameters may be distinct from the first subset of RF circuit calibration parameters. At least the first subset of RF circuit calibration parameters is verified, and after the verifying, at least the first subset of RF circuit calibration parameters are written to a memory associated with the RF circuit.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and apparatus comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for calibrating radio frequency (RF) circuits using machine learning techniques.

RF circuits are subject to variability in fabrication and operating parameters that may affect the operation of such integrated circuits. For example, variations in fabrication, such as variations in etch depths, metal or oxide layer thicknesses, impurity concentrations, and the like, may affect the resistance of individual circuits, threshold voltages, and the like. Further, as RF circuits become more complex, additional parameters may be configured for each RF circuit. For example, the introduction of additional functionality to support MIMO techniques, higher frequency bands (e.g., FR1 or FR2), and the like, may introduce new parameters for calibration to account for increases in uplinks and downlinks within an RF circuit and more generally to account for the additional components within the RF circuit to implement support for this additional functionality.

Aspects of the present disclosure provide techniques for calibrating RF circuits using at least some parameters predicted using machine learning techniques. Generally, the predicted parameters may be a subset of the universe of parameters with which the RF circuit can be configured and may be predicted based on a set of calibrated parameters for the RF circuit. By calibrating a first set of RF circuit calibration parameters and using this first set to predict (e.g., using machine learning) a second set of RF circuit calibration parameters, computing resources used in calibrating RF circuits may be reduced relative to calibrating the whole universe of RF circuit calibration parameters for any given RF circuit.

Example Radio Frequency (RF) Circuit Calibration Pipeline

Figure 1:
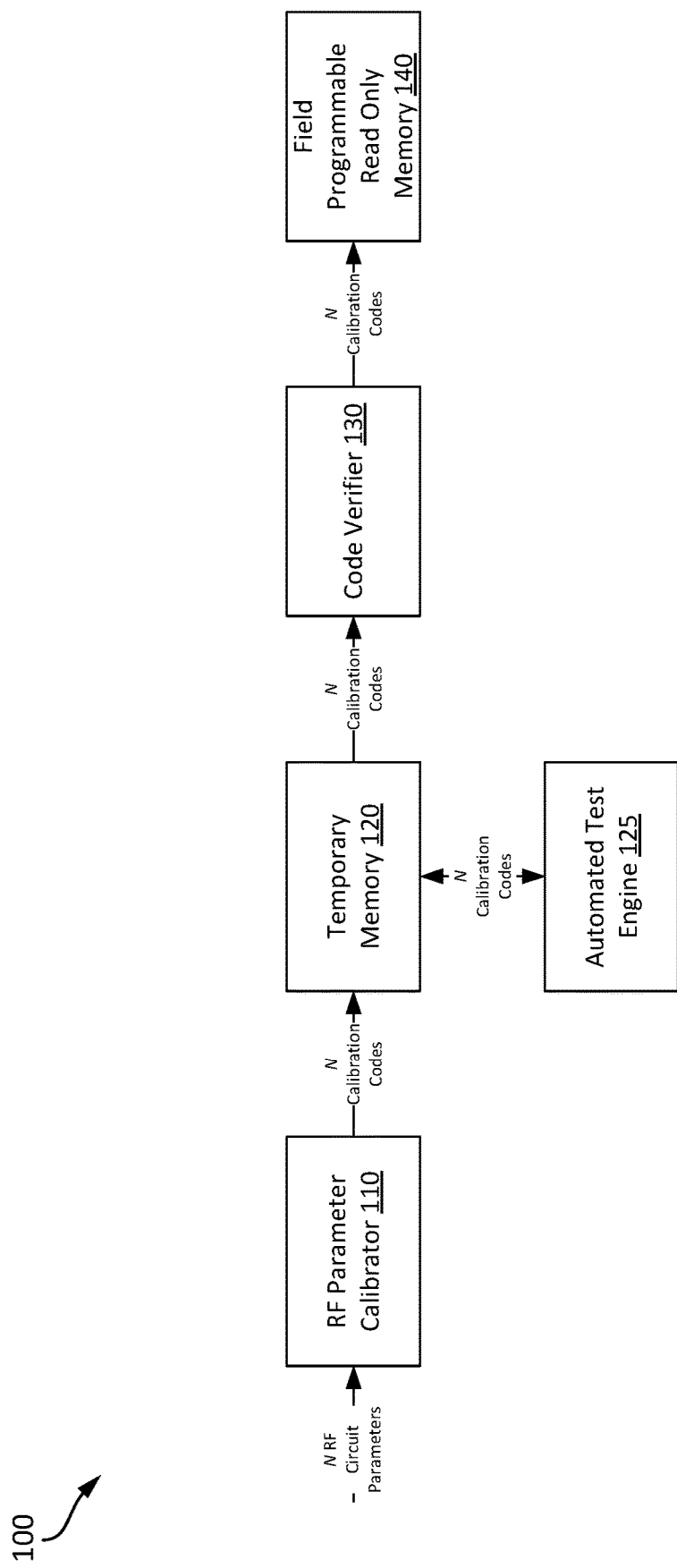
FIG. 1 depicts an example pipeline for calibrating radio frequency (RF) circuits.

FIG. 1 depicts an example pipeline 100 in which RF circuits are calibrated. As illustrated, pipeline 100 includes an RF parameter calibrator 110, temporary memory 120, automated test engine 125, code verifier 130, and field programmable read-only memory (FPROM) 140.

An RF circuit being calibrated generally includes a number of circuits that allow for the upconversion of baseband or intermediate frequency signals to a radio frequency signal for transmission and for the downconversion of received radio frequency signals to intermediate or baseband frequency signals for processing. These circuits may include, for example, power amplifiers, low noise amplifiers, mixers, filters, frequency synthesizers, phase-locked loops, and the like. Generally, the number of components within an RF circuit may increase as the complexity of the RF circuit increases, for example, to support additional frequency bands (e.g., for carrier aggregation), larger numbers of antennas (e.g., diversity reception), and the like. As the number of components in the RF circuit increases, the number of circuit parameters to be calibrated may also increase.

For a number N of parameters to be calibrated, RF parameter calibrator 110 can test and calibrate each parameter and generate N calibration codes for verification. These calibration codes may include, for example, codes that adjust power usage parameters, control current biases within the RF circuit, measure and control voltages at the RF circuit, and the like. Generally, as the total number of circuit parameters increases, the total number of calibrations performed by RF parameter calibrator 110 may increase.

The N calibration codes may be written to temporary memory 120, and an automated test engine 125 can access the N calibration codes stored in the temporary memory to evaluate the RF circuit being calibrated (e.g., a first pass through the measurement system). Generally, automated test engine 125 can perform various measurements, such as current draw, voltage, and the like, of the RF circuit being calibrated and can determine whether additional calibration is to be performed. Further, automated test engine 125 can log the calibration codes generated by RF parameter calibrator 110 for future use.

The N calibration codes may also be provided to code verifier 130 for verification. In some aspects, the N calibration codes may be provided to code verifier 130 for verification based on instructions generated by the automated test engine 125 to finalize the calibration of the RF circuit. Generally, in verifying these calibration codes, code verifier 130 can determine whether the RF circuit, as configured based on the N calibration codes, meets a target set of performance parameters (e.g., a second pass through the measurement system). If the target set of performance parameters is met, code verifier 130 can write the N calibration codes to FPROM 140 associated with the RF circuit (also referred to as burning the calibration codes to the FPROM). The calibration codes written to FPROM 140 may subsequently be used by the RF circuit during operations.

As discussed, generating and verifying the calibration codes for an RF circuit may be a resource-intensive process. First, the number of calibration codes to be generated and verified may increase as the complexity of the RF circuit increases. Additionally, for each parameter, calibration may be a multistep process that generates a calibration code, verifies the calibration code, and refines the generated calibration code based on the output of a verification process. However it may also be observed that some RF circuit parameters may change systematically (e.g., be specific to a die, and the fabrication parameters of that die), while other circuit parameters may change randomly. Because parameters that change systematically may be predictable, aspects of the present disclosure can leverage this predictability to reduce the number of RF circuit calibration parameters that are generated and verified while maintaining the performance of the RF circuit and minimizing, or at least reducing, yield loss from circuits that cannot be calibrated to comply with a defined set of performance parameters.

Example Machine Learning Model-Based Radio Frequency (RF) Circuit Calibration Pipeline To leverage the predictability of some RF circuit calibration parameters, aspects of the present disclosure use machine learning models to identify relationships between different circuit calibration parameters and to generate a set of parameters whose calibration can be predicted with minimal, or at least reduced, yield loss. By doing so, a first set of RF circuit calibration parameters can be generated through a parameter calibrator, and this first set of RF circuit calibration parameters can be used to predict a second set of RF circuit calibration parameters. Because the first set of RF circuit calibration parameters may be a subset of a universe of RF circuit calibration parameters, aspects of the present disclosure may reduce the computing resources used in calibrating an RF circuit by reducing the number of calibration codes that are generated and verified using the calibration pipeline discussed above.

Figure 2A:
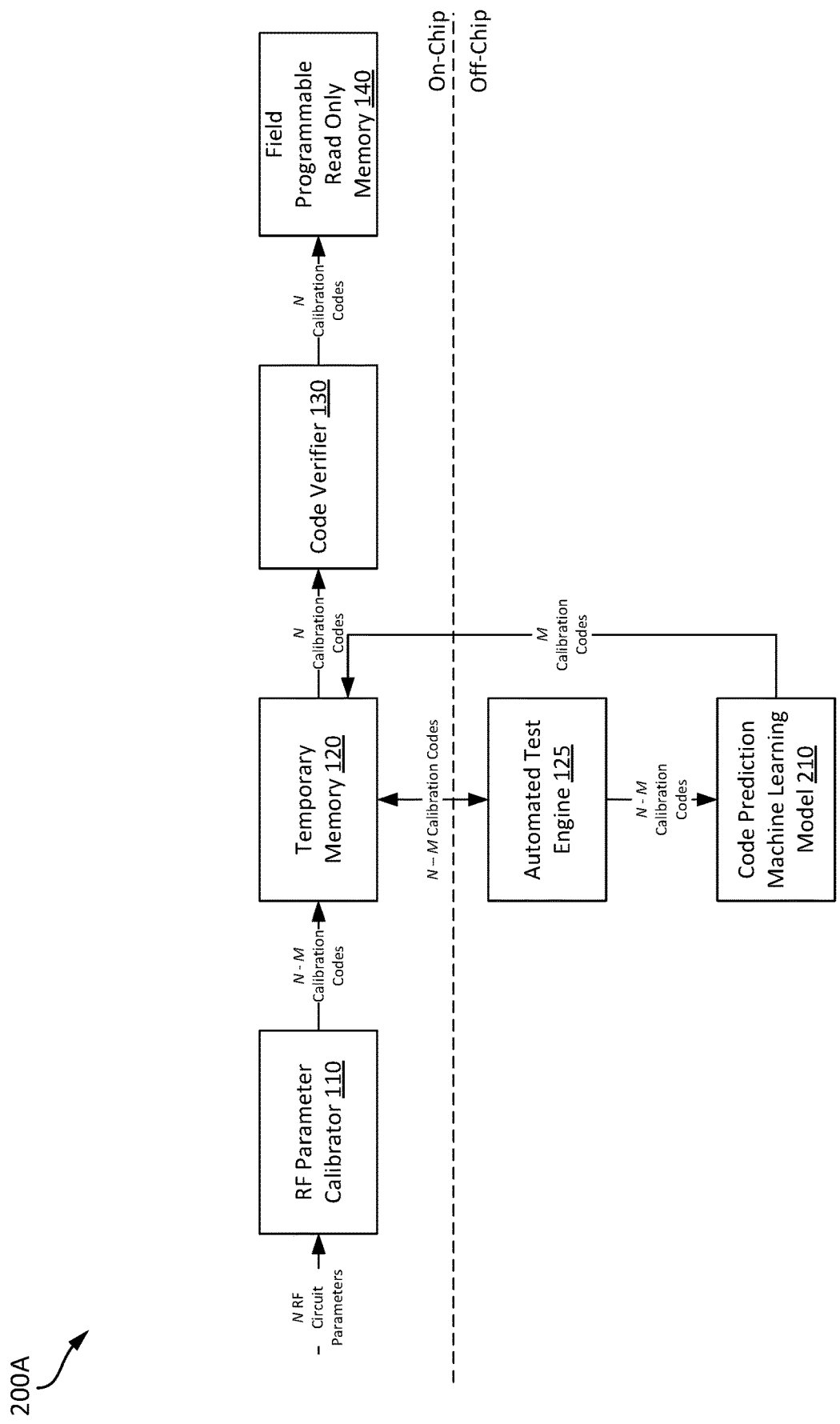
FIG. 2A and FIG. 2B illustrate example pipelines for off-chip calibration of RF circuits using machine learning models, according to aspects of the present disclosure.
Figure 2B:
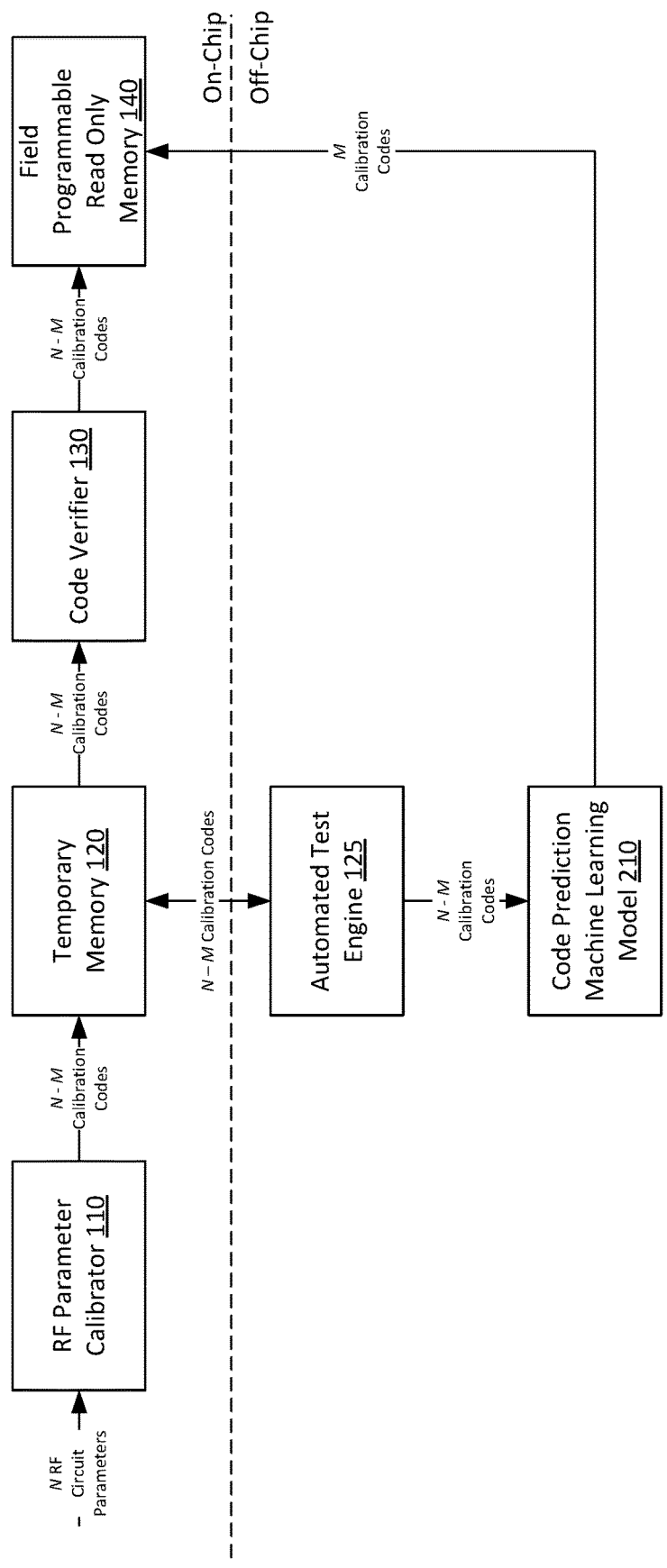

FIG. 2A and FIG. 2B illustrate example pipelines 200A and 200B for off-chip calibration of RF circuits using machine learning models, according to aspects of the present disclosure. In these pipelines 200A and 200B, a code prediction machine learning model can predict the values for a set of RF circuit calibration codes based on the output of an off-chip automated test engine and can output the predicted values for the set of RF circuit calibration codes for verification or directly write the predicted values for the set of RF circuit calibration codes to an FPROM or other memory associated with the RF circuit.

FIG. 2A illustrates an example pipeline 200A in which RF circuit calibration codes are predicted by a machine learning model. As illustrated, for a set of N RF circuit parameters, RF parameter calibrator 110 can be configured to generate calibration codes for N-M parameters. The M parameters may be parameters that can be predicted by code prediction machine learning model 210, as discussed in further detail below, while the N-M parameters may be parameters that are to be calibrated by RF parameter calibrator 110 and used by code prediction machine learning model 210 to predict the calibration codes for the M parameters. The N-M calibration codes may be written to temporary memory 120 on the chip with the RF circuit being calibrated.

Off chip, an automated test engine 125 can access these N-M calibration codes for evaluation. Further, automated test engine 125 can provide the N-M calibration codes to code prediction machine learning model 210, which can use at least a portion of the N-M calibration codes to predict values for the M calibration codes. Code prediction machine learning model 210, as illustrated, can write the M calibration codes to temporary memory 120.

After code prediction machine learning model 210 generates the M calibration codes and writes the M calibration codes to temporary memory 120, code verifier 130 can retrieve N calibration codes and verify that these codes result in an RF circuit that performs according to a defined set of performance parameters. The N calibration codes retrieved from temporary memory 120 generally include a first subset of RF circuit calibration codes, corresponding to the N-M parameters that are calibrated by RF parameter calibrator 110, and a second subset of RF circuit calibration codes, corresponding to the M parameters that are predicted by code prediction machine learning model 210. After code verifier 130 verifies that the N calibration codes result in performance that meets the defined set of performance parameters, code verifier 130 can write the N calibration codes to FPROM 140.

In the example illustrated in pipeline 200A, the number of calibrations performed on RF circuit parameters may be reduced by M. Code verifier 130, however, may verify all N calibration codes (or at least a portion of the N calibration codes, including some of the M calibration codes) before writing the N calibration codes to FPROM 140.

In some aspects, additional performance gains may be achieved by reducing the number of calibration codes that are verified (and thus subject to refinement via additional calibration) by the code verifier. As illustrated in FIG. 2B, pipeline 200B allows for the M calibration codes predicted by code prediction machine learning model 210 to be written directly to FPROM 140, without being verified by code verifier 130. In pipeline 200B, automated test engine 125 can receive the N-M calibration codes generated by RF parameter calibrator 110 and instruct code verifier 130 to verify these N-M calibration codes. Meanwhile, the code prediction machine learning model 210 can use the N-M calibration codes to predict the values of calibration codes for the M circuit parameters that were not calibrated by RF parameter calibrator 110.

In pipeline 200B, thus, two write paths may exist for writing calibration codes to FPROM 140. A first write path, from code verifier 130, may be used to write calibration codes to FPROM 140 for parameters that cannot be (or were designated not to be) predicted using code prediction machine learning model 210 and thus are to be calibrated using RF parameter calibrator 110 and verified using code verifier 130. A second write path, from code prediction machine learning model 210, may be used to write predicted calibration codes to FPROM 140 for those parameters that can be predicted (and were designated to be predicted) based on the N-M calibration codes generated by RF parameter calibrator 110. Because the M calibration codes may be written directly to FPROM 140 in pipeline 200A without processing these codes through code verifier 130, both the number of calibrations and the number of verifications may be reduced by M, thus further reducing the amount of computing resources used to calibrate an RF circuit.

Figure 3A:
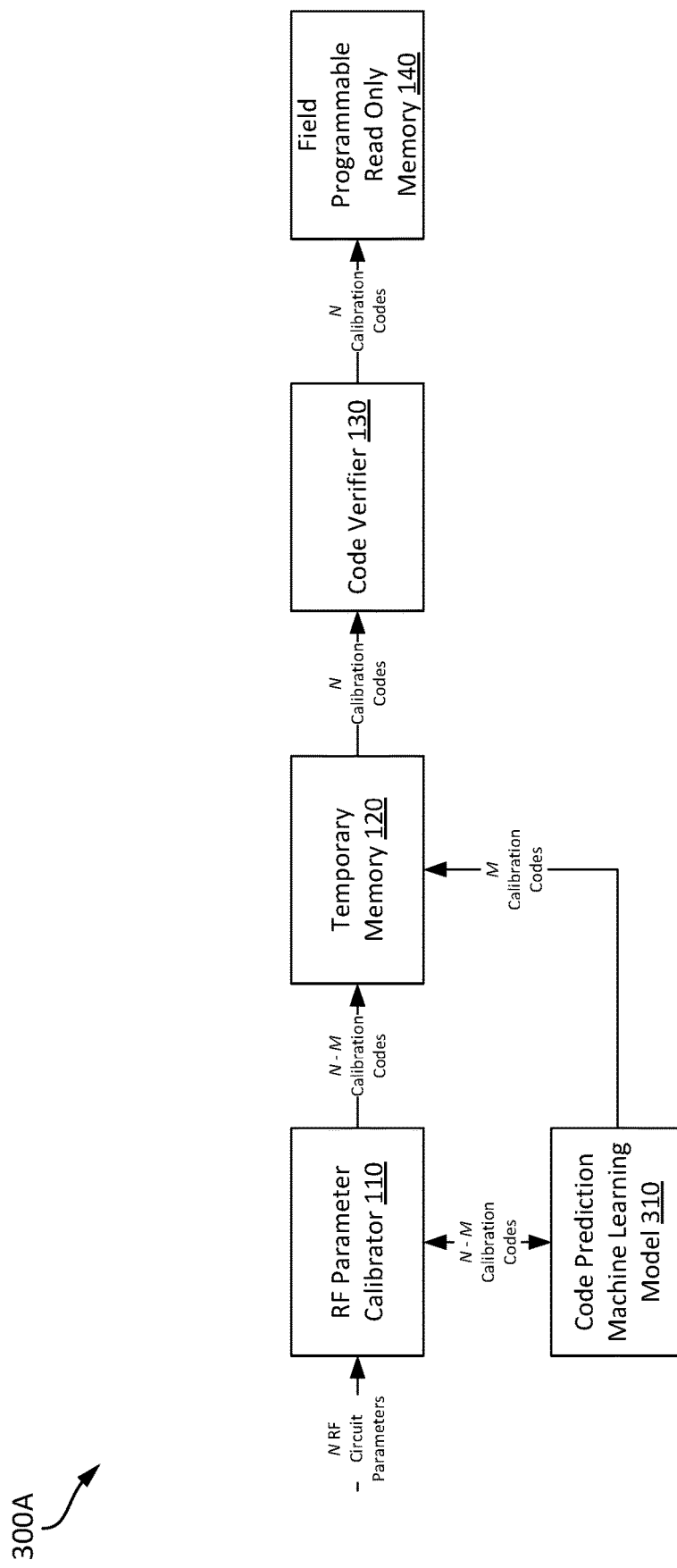
FIG. 3A and FIG. 3B illustrate example pipelines for on-chip calibration of RF circuits using machine learning models, according to aspects of the present disclosure.
Figure 3B:
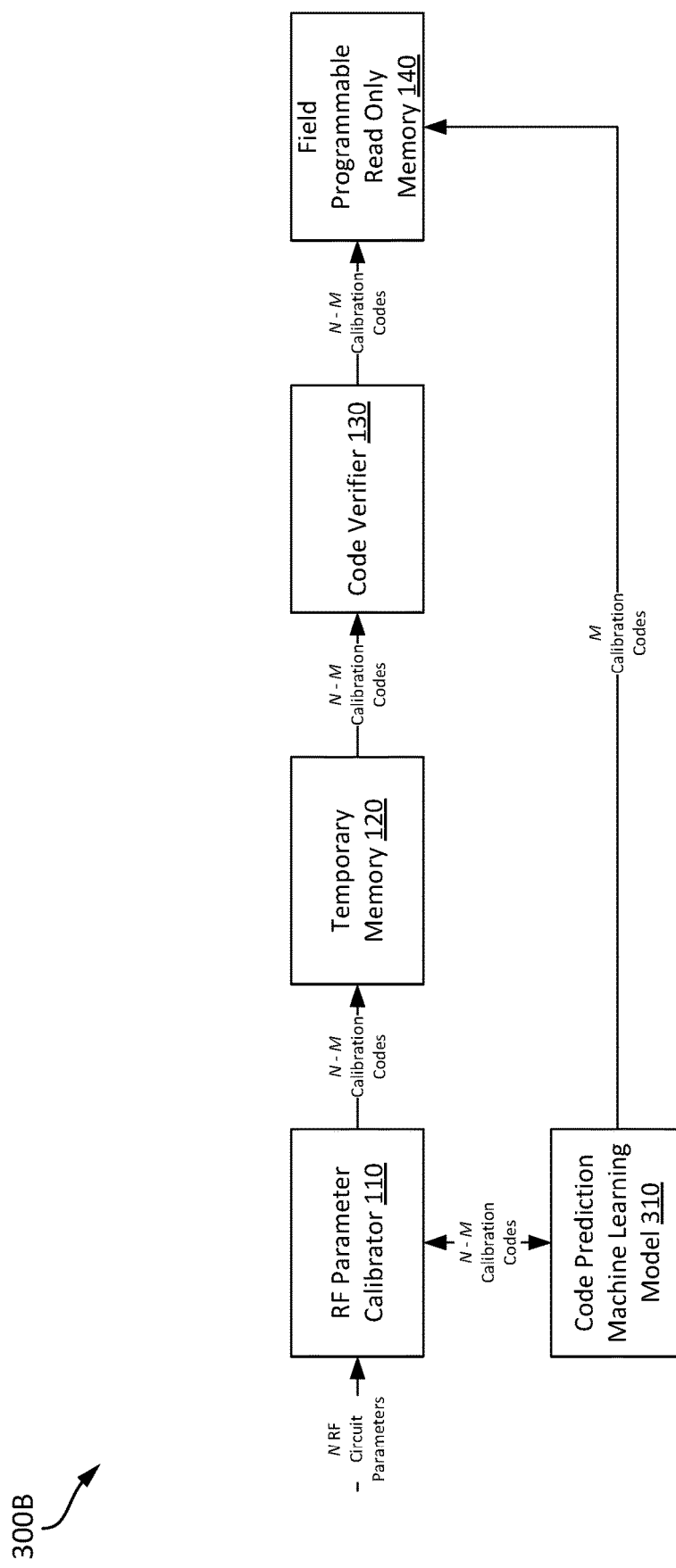

In some aspects, RF circuit parameter calibration can be performed on-chip, without the use of an off-chip automated test engine. FIG. 3A and FIG. 3B illustrate example pipelines for on-chip calibration of RF circuits using machine learning models, according to aspects of the present disclosure.

As illustrated by pipeline 300A in FIG. 3A, RF parameter calibrator 110 can receive N RF circuit parameters and generate N-M calibration codes for the subset of calibration parameters that cannot be (or were designated not to be) predicted using code prediction machine learning model 310. The N-M calibration codes may be written to temporary memory 120 and provided to code prediction machine learning model 310. Code prediction machine learning model 310 can use the N-M calibration codes as an input to predict the values of the M parameters for which RF parameter calibrator 110 did not generate a calibration code. These M calibration codes may also be written to temporary memory 120, resulting in N calibration codes being stored in temporary memory 120. Similar to pipeline 200A illustrated in FIG. 2A, code verifier 130 in pipeline 300A may thus verify N calibration codes and, once verified, write the N calibration codes to FPROM 140. Thus, like pipeline 200A, the number of calibration operations performed in pipeline 300A may be reduced by M, and the number of verification operations may remain N.

Like pipeline 200B, pipeline 300B of FIG. 3B may achieve further reductions in compute resource utilization in the calibration and verification of RF circuits. As illustrated in FIG. 3B, code prediction machine learning model 310 can use the N-M calibration codes to predict calibration codes for the M parameters that were not calibrated by RF parameter calibrator 110. The M calibration codes may be written directly to FPROM 140 (e.g., without being verified by code verifier 130). Meanwhile, the N-M calibration codes can be verified by code verifier 130, and once verified, may be written to FPROM 140. In pipeline 300B, the direct writing of the M calibration codes to FPROM 140 may thus reduce the number of calibration operations and the number of verification operations by M.

In some aspects, machine learning models may be used to predict calibration codes for a subset of RF circuit calibration parameters for direct use by an RF circuit. As illustrated by pipeline 400 in FIG. 4, N-M calibration codes may be generated by RF parameter calibrator 110 for the subset of parameters that cannot be (or were designated not to be) predicted by a code prediction machine learning model 410. The N-M calibration codes may be written to temporary memory 120 and verified by code verifier 130 (and possibly refined, based on the output of code verifier 130). The verified N-M calibration codes may be written to FPROM 140.

For the M parameters that can be predicted (and were designated to be predicted) based on the N-M calibration codes, code prediction machine learning model 410 can predict these codes while the RF circuit is operating. The M calibration codes may thus be output for use in calibrating the RF circuit, in conjunction with the N-M calibration codes written to FPROM 140, and the RF circuit can be configured with a total of N codes. Because the M calibration codes may be generated while the RF circuit operates, pipeline 400 may reduce the number of calibration operations and the number of verification operations by M. Further, because N-M calibration codes are written to FPROM 140, the size of FPROM 140 may also be reduced by a factor of M.

Example Machine Learning Models for Predicting RF Circuit Calibration Parameters The machine learning models described herein may generally be trained to identify a subset of calibration parameters that can be predicted with yield loss below a threshold amount. That is, the calibration parameters that are predicted by the machine learning models described herein may result in calibration parameters that allow for an RF circuit to operate according to a defined set of performance parameters, without losing more than the threshold amount of circuits due to an inability to operate according to the defined set of performance parameters. Generally, the machine learning model may use, as an input, a set of exemplar parameters, corresponding to parameters calibrated by an RF parameter calibrator 110 illustrated in FIGS. 2-4, to generate a set of non-exemplar parameters.

In one example, the machine learning model may be trained based on pairwise correlations between parameters in a data set of calibration parameters over a set of dies on which RF circuits are calibrated. The pairwise correlations may be clustered by correlation into a plurality of clusters. In each cluster, one parameter in an exemplar set of parameters may be associated with a plurality of parameters in a non-exemplar set of parameters. The clustering may be optimized to generate a minimal number of clusters. While this example may allow for some parameters to be predicted, a minimal number of parameters can be calibrated using the values of other parameters while maintaining yield loss less than a threshold amount.

In another example, the machine learning model may be trained based on yield similarity clustering. In generating a training data set, a yield loss percentage may be calculated for each pair of parameters in a historical data set of RF circuit calibration parameters. Generally, the yield loss may be calculated based on the yield loss that would be experience by calibrating a second parameter in a pair of parameters using a value of the first parameter. Generally, a yield loss similarity may indicate whether yield loss below a threshold amount is maintained by replacing the value of the second parameter with the value of the first parameter. Yield loss similarity may be clustered such that a centroid of each cluster may correspond to an exemplar parameter calibrated by RF parameter calibrator 110 illustrated in FIGS. 2-4, while other parameters in the cluster may correspond to non-exemplar parameters that can be predicted by the machine learning model. The number of clusters may be minimized so that the yield loss of each cluster is less than a threshold value.

To allow for additional reductions in the number of RF circuit calibration parameters that can be predicted using machine learning models, an iterative process can be used to evaluate RF circuit calibration parameters and identify parameters that have a yield loss less than a threshold value. The set of exemplar parameters may thus be selected using iterative, or "greedy," methods, and the predicted calibration codes may be generated based on one or more regression models. For example, the regression model may be a lasso regression model in a loss function that is optimized by removing or minimizing features that are less important to the predictions generated by the model. In this case, circuit calibration may converge on local optima instead of global optima, and some circuit calibration parameters that could be predicted may not actually be predicted using these techniques.

In still another example, the machine learning model used to identify and predict the values of RF circuit calibration parameters may be a dropout gradient descent network. The dropout gradient descent network generally allows the machine learning model to use information from each of the exemplar parameters in order to predict the values of the non-exemplar parameters, and the set of exemplars may be minimized based on sparsity criteria. To build this dropout gradient descent network, which may be a neural network, an exemplar search space may be generated initially on a per-parameter basis. For each parameter, the values of other parameters in the universe of RF circuit calibration parameters may be predicted, with an identity connection for the parameter being masked in a neural network. The candidate set of exemplar parameters may be, for example, selected based on a linear regression model, and the set of candidate non-exemplar parameters may be the set of parameters that can be predicted with yield loss less than a threshold value.

The candidate set of non-exemplar parameters may be further refined based on a drop probability metric associated with each parameter in the candidate set of non-exemplar parameters. To do so, drop probabilities may be initialized based on weights extracted from the linear regression model discussed above. Each candidate non-exemplar parameter, $p_{ne}$, may be associated with a weight $w_{p_{ne}T_e}$ associated with a target parameter $T_e$, where $p_{ne} \neq T_e$. For each parameter, the maximal weight is selected across all target parameters T, according to the equation: $\max(p_e)$, $e \in T$. The dropout probability for each $p_{ne}$ may be initialized as the output of a softmax function over all parameters p.

The final set of exemplar parameters may be selected by identifying parameters in the candidate set of non-exemplar parameters that are actually exemplar parameters that are to be calibrated in order to predict the values of the non-exemplar parameters. To do so, a variational mask may be applied to an input layer to optimize a parameterized dropout rate. The loss function can penalize a count of features that are not dropped out of the set of candidate non-exemplar values. Parameters with keep probabilities exceeding a threshold value may be retained in the set of non-exemplar parameters, and the parameters with keep probabilities less than a threshold value may be included in the set of exemplar parameters. Finally, based on the learned set of non-exemplar parameters, a linear network can be trained to identify the learned set of exemplar parameters. This may result in a model that has no dropout on the non-exemplar parameters for which the model will be used to predict values.

In another example, the dropout gradient descent network can be structured as a linear network. In doing so, the candidate set of predictable parameters may be generated based on a gradient descent optimization of a linear regression function. The linear regression function may be a regression function over weights associated with each parameter in the candidate set.

Example RF Circuit Calibration Using Machine Learning Models

Figure 4:
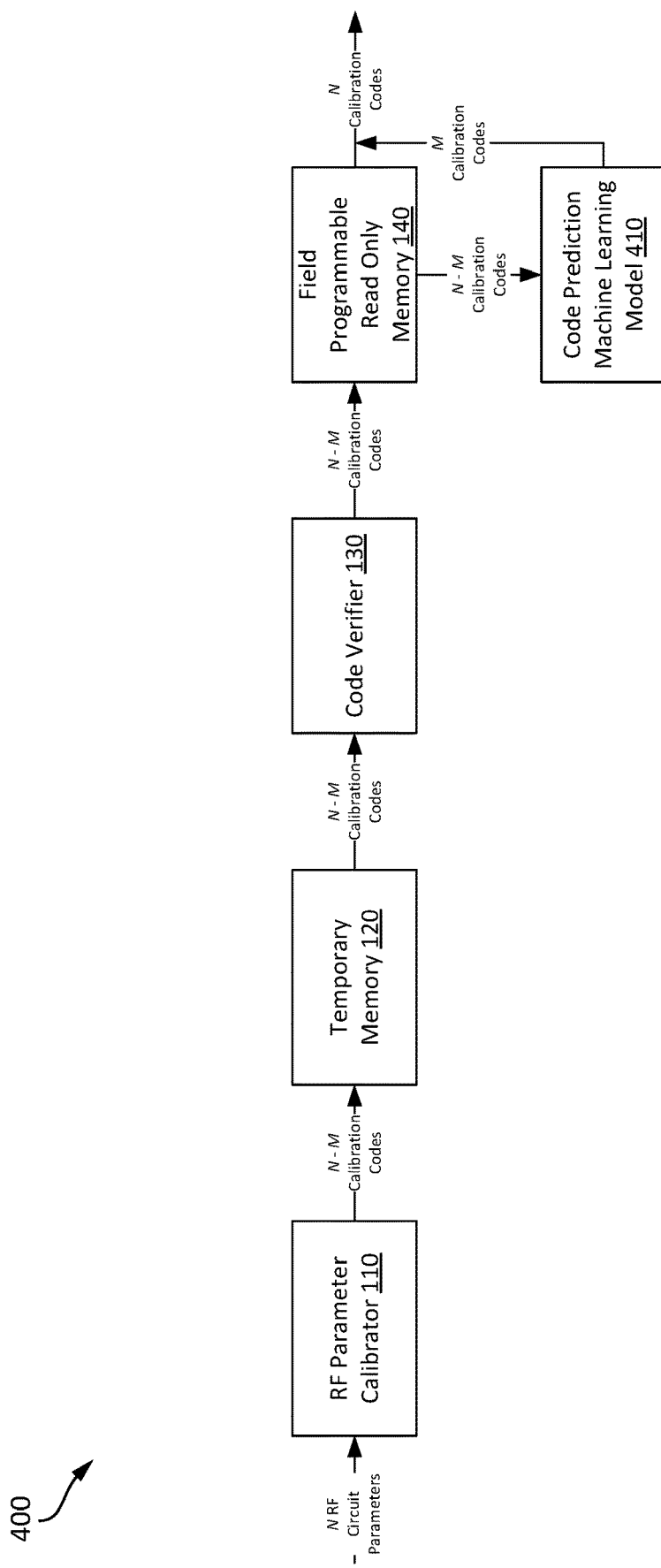
FIG. 4 illustrates an example pipeline for real-time calibration of RF circuits using machine learning models, according to aspects of the present disclosure.
Figure 5:
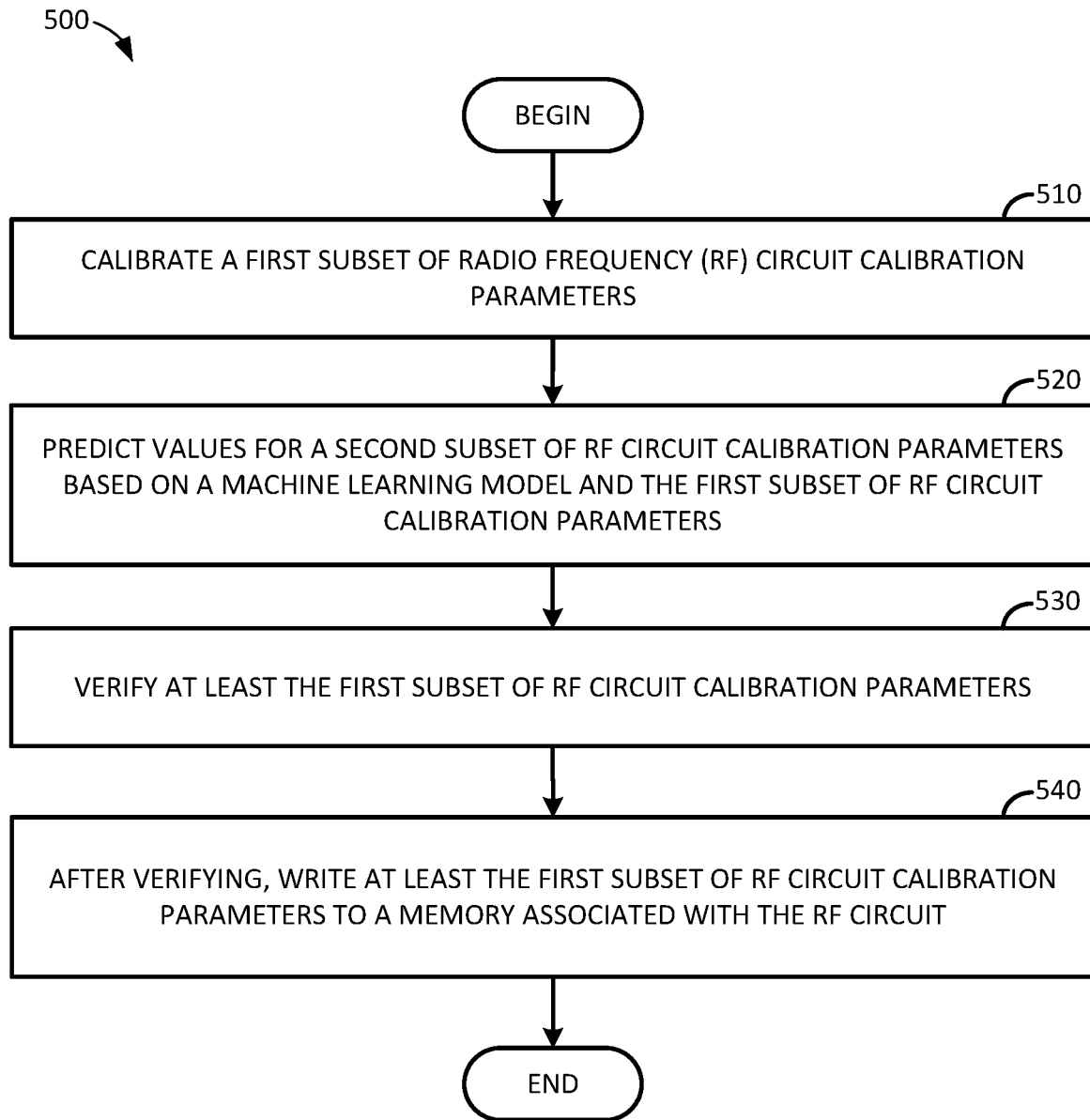
FIG. 5 illustrates example operations that may be performed by an RF circuit calibration system to calibrate an RF circuit using a machine learning model, according to aspects of the present disclosure.

FIG. 5 illustrates example operations 500 that may be performed (e.g., by an RF circuit calibration pipeline 200A-B, 300A-B, or 400 illustrated in FIGS. 2-4) to calibrate an RF circuit using a machine learning model.

As illustrated, operations 500 may begin at block 510, where a first set of RF circuit calibration parameters is calibrated. The first subset of RF circuit calibration parameters may be a set of exemplar parameters that can be used by a machine learning model to predict the values of one or more parameters in a second set of RF circuit calibration parameters (also referred to as a set of non-exemplar parameters).

At block 520, values for a second subset of RF circuit calibration parameters are predicted based on a machine learning model and the first subset of RF circuit calibration parameters. The second subset of RF circuit calibration parameters may, for example, comprise RF circuit calibration parameters predictable with a yield loss less than a threshold value.

In some aspects, the second subset of RF circuit calibration parameters can be identified using various techniques. For example, to identify the second subset of RF circuit calibration parameters, pairwise correlations may be extracted between parameters in a historical data set of RF circuit calibration parameters. These pairwise correlations may be clustered into a plurality of clusters. Each cluster of the plurality of clusters may generally be associated with a plurality of parameters in the second subset of RF circuit calibration parameters and a parameter in the first subset of RF circuit calibration parameters. The clustering may be performed such that a minimal number of clusters is generated.

In some aspects, identifying the second subset of RF circuit calibration parameters may be performed on a per-parameter-pair basis. For each pair of parameters, including a first parameter and a second parameter in a historical data set of RF circuit calibration parameters, a yield loss may be calculated by calibrating the second parameter using a value of the first parameter. A yield loss similarity value may be generated for the respective pair of parameters based on the calculated yield loss for the respective pair of parameters, and pairwise correlations may be clustered between each respective pair of parameters based on the yield loss similarity value for each respective pair of parameters. The clustering may be performed such that a minimal number of clusters is generated.

In some aspects, identifying the second subset of RF circuit calibration parameters may include iteratively evaluating RF circuit calibration parameters to identify parameters having a yield loss less than a threshold value.

In some aspects, identifying the second subset of RF circuit calibration parameters may include identifying the second subset of RF circuit calibration parameters based on a dropout gradient descent network. The dropout gradient descent network may include, for example, a neural network. In such a case, the second subset of RF circuit calibration parameters may be identified on a per-parameter basis. For each parameter within a universe of RF circuit calibration parameters, other parameters in the universe of RF circuit calibration parameters are predicted, with an identity connection for the respective parameter masked in the neural network. A candidate set of predictable parameters is generated based on predicted parameters having a yield loss less than a threshold value, and the candidate set of predictable parameters is refined based on a drop probability metric associated with each parameter in the candidate set of predictable parameters.

In some aspects, to generate the candidate set of predictable parameters, a weight may be assigned for each respective parameter in the candidate set based on weights extracted from the neural network. Generally, a weight associated with the respective parameter corresponds to an effect of the respective parameter on each target parameter. A maximum weight for each respective parameter in the candidate set is identified across a set of target parameters associated with the respective parameter. A drop probability value is initialized for each respective parameter based on a softmax function calculated over the maximum weight for each respective parameter in the candidate set.

In some aspects, in order to generate the candidate set of predictable parameters, the candidate set is generated based on gradient descent optimization of a linear regression function over weights associated with each respective parameter in the candidate set.

At block 530, at least the first subset of RF circuit calibration parameters is verified.

At block 540, after verifying at least the first subset of RF circuit calibration parameters, at least the first subset of RF circuit calibration parameters is written to a memory associated with the RF circuit. (e.g., FPROM 140)

In some aspects, the second subset of RF circuit calibration parameters may also be verified. After verifying the second subset of RF circuit calibration parameters, the second subset of RF circuit calibration parameters may be written to the memory associated with the RF circuit.

In some aspects, the RF circuit may be operated based on the second subset of RF circuit calibration parameters and the at least the first subset of RF circuit calibration parameters written to the memory associated with the RF circuit. The second subset of RF circuit parameters may be used to operate the RF circuit directly, without passing through a verification stage, or may be verified prior to being used to operate the RF circuit.

Figure 6:
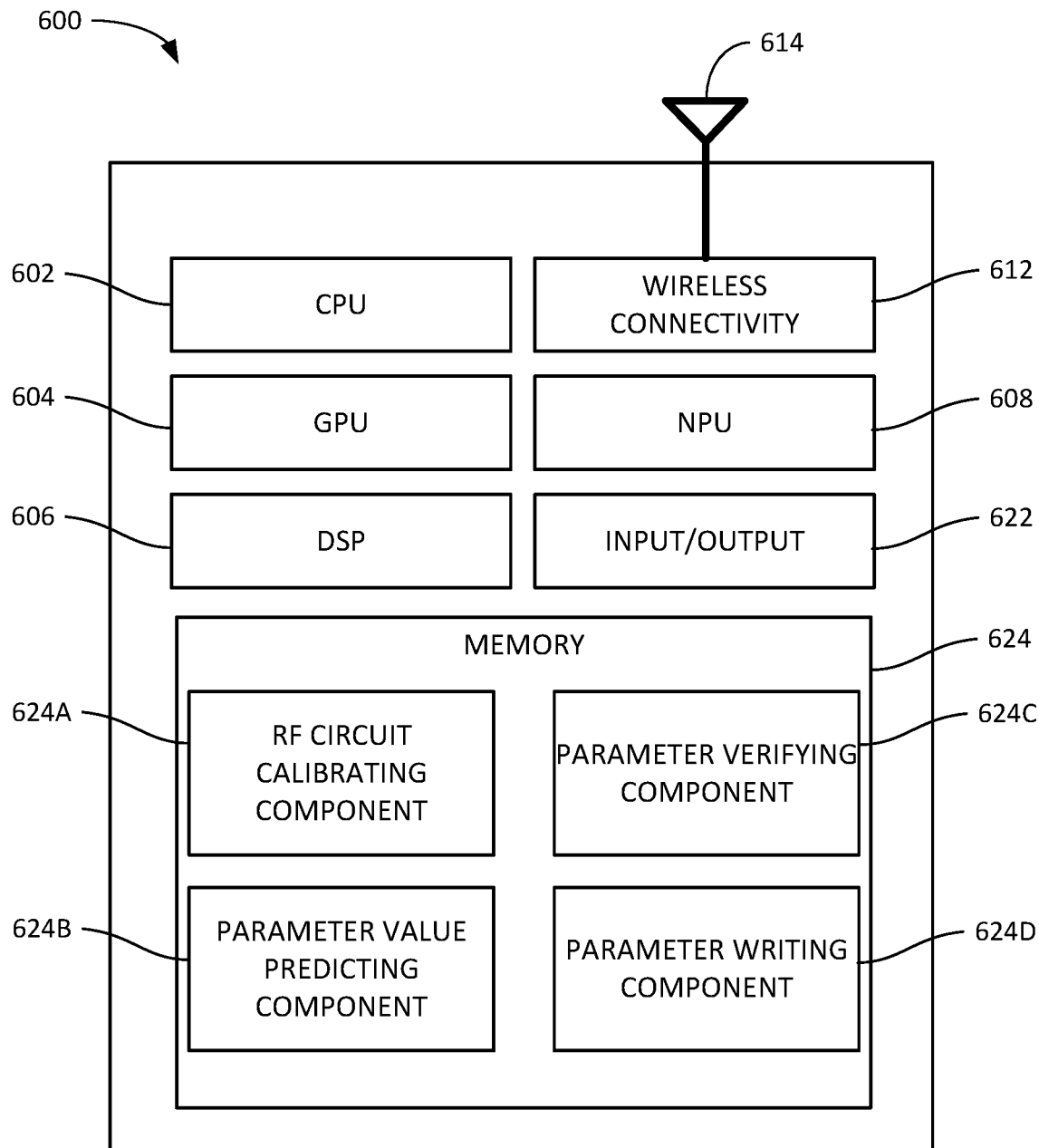
FIG. 6 illustrates an example implementation of a processing system in which an RF circuit can be calibrated using a machine learning model, according to aspects of the present disclosure.

Example Processing Systems for Calibrating RF Circuits Using Machine Learning Models FIG. 6 depicts an example processing system 600 for calibrating RF circuits using machine learning models, such as described herein for example with respect to FIG. 5.

Processing system 600 includes a central processing unit (CPU) 602, which in some examples may be a multi-core CPU. Instructions executed at the CPU 602 may be loaded, for example, from a program memory associated with the CPU 602 or may be loaded from memory 624.

Processing system 600 also includes additional processing components tailored to specific functions, such as a graphics processing unit (GPU) 604, a digital signal processor (DSP) 606, a neural processing unit (NPU) 608, a multimedia processing unit 610, a wireless connectivity component 612.

An NPU, such as NPU 608, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In one implementation, NPU 608 is a part of one or more of CPU 602, GPU 604, and/or DSP 606.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes RF circuit calibrating component 624A, parameter value predicting component 624B, parameter verifying component 624C, and parameter writing component 624D. The depicted components, and others not depicted, may be configured to perform various aspects of the methods described herein.

EXAMPLE CLAUSES

Clause 1: A method for calibrating a radio frequency (RF) circuit, comprising: calibrating a first subset of RF circuit calibration parameters; predicting values for a second subset of RF circuit calibration parameters based on a machine learning model and the first subset of RF circuit calibration parameters, the second subset of RF circuit calibration parameters being distinct from the first subset of RF circuit calibration parameters; verifying at least the first subset of RF circuit calibration parameters; and after the verifying, writing at least the first subset of RF circuit calibration parameters to a memory associated with the RF circuit.

Clause 2: The method of clause 1, further comprising identifying the second subset of RF circuit calibration parameters.

Clause 3: The method of clause 2, wherein identifying the second subset of RF circuit calibration parameters comprises: extracting pairwise correlations between parameters in a historical data set of RF circuit calibration parameters; and clustering the pairwise correlations into a plurality of clusters, each cluster of the plurality of clusters being associated with a plurality of parameters in the second subset of RF circuit calibration parameters and a parameter in the first subset of RF circuit calibration parameters.

Clause 4: The method of clause 3, wherein clustering the pairwise correlations comprises generating a minimal number of clusters.

Clause 5: The method of any of clauses 2 through 4, wherein identifying the second subset of RF circuit calibration parameters comprises: for each respective pair of parameters including a first parameter and a second parameter in a historical data set of RF circuit calibration parameters: calculating a yield loss generated by calibrating the second parameter using a value of the first parameter, and generating a yield loss similarity value for the respective pair of parameters based on the calculated yield loss for the respective pair of parameters; and clustering pairwise correlations between each respective pair of parameters based on the yield loss similarity value for each respective pair of parameters.

Clause 6: The method of clause 5, wherein clustering the pairwise correlations comprises generating a minimal number of clusters such that a yield loss for each cluster is less than a threshold value.

Clause 7: The method of any of clauses 2 through 6, wherein identifying the second subset of RF circuit calibration parameters comprises iteratively evaluating RF circuit calibration parameters to identify parameters having a yield loss less than a threshold value.

Clause 8: The method of any of clauses 2 through 7, wherein identifying the second subset of RF circuit calibration parameters comprises identifying the second subset of RF circuit calibration parameters based on a dropout gradient descent network.

Clause 9: The method of clause 8, wherein: the dropout gradient descent network comprises a neural network; and identifying the second subset of RF circuit calibration parameters comprises, for each respective parameter of a universe of RF circuit calibration parameters: predicting other parameters in the universe of RF circuit calibration parameters with an identity connection for the respective parameter masked in the neural network; generating a candidate set of predictable parameters based on predicted parameters having a yield loss less than a threshold value; and refining the candidate set of predictable parameters based on a drop probability metric associated with each parameter in the candidate set of predictable parameters.

Clause 10: The method of clause 9, wherein generating the candidate set of predictable parameters comprises: assigning a weight for each respective parameter in the candidate set based on weights extracted from the neural network, wherein a weight for the respective parameter corresponds to an effect of the respective parameter on each target parameter; identifying a maximum weight for each respective parameter in the candidate set across a set of target parameters associated with the respective parameter; and initializing a drop probability value for each respective parameter based on a softmax function calculated over the maximum weight for each respective parameter in the candidate set.

Clause 11: The method of clause 9 or 10, wherein generating the candidate set of predictable parameters comprises generating the candidate set based on gradient descent optimization of a linear regression function over weights associated with each respective parameter in the candidate set.

Clause 12: The method of any of clauses 1 through 11, wherein the second subset of RF circuit calibration parameters comprises RF circuit calibration parameters predictable with a yield loss less than a threshold value.

Clause 13: The method of any of clauses 1 through 12, further comprising verifying the second subset of RF circuit calibration parameters.

Clause 14: The method of clause 13, further comprising after verifying the second subset of RF circuit calibration parameters, writing the second subset of RF circuit calibration parameters to the memory associated with the RF circuit.

Clause 15: The method of any of clauses 1 through 14, further comprising operating the RF circuit based on the second subset of RF circuit calibration parameters and the at least the first subset of RF circuit calibration parameters written to the memory associated with the RF circuit.

Clause 16: An apparatus comprising: a memory having executable instructions stored thereon; and a processor configured to execute the executable instructions to cause the apparatus to perform a method in accordance with any of clauses 1 through 15.

Clause 16: An apparatus comprising: means for performing a method in accordance with of any of clauses 1 through 15.

Clause 17: A non-transitory computer-readable medium having instructions stored thereon which, when executed by a processor, cause the processor to perform a method in accordance with of any of clauses 1 through 15.

Clause 18: A computer program product embodied on a computer-readable storage medium comprising code for performing a method in accordance with any of Clauses 1 through 15.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Example means for calibrating may include, for example, RF parameter calibrator 110 illustrated in FIGS. 2 through 4, among others. Example means for predicting may include, for example, code prediction machine learning models 210, 310, or 410 illustrated in FIGS. 2 through 4, among others. Example means for verifying may include, for example, code verifier 130 illustrated in FIGS. 2 through 4, among others. Example means for writing may include, for example, code verifier 130, code prediction machine learning models 210, 310, or 410, and/or FPROM 140 illustrated in FIGS. 2 through 4, among others.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for calibrating a radio frequency (RF) circuit, comprising:
    generating, based on a machine learning model and a first subset of RF circuit calibration parameters, values for a second subset of RF circuit calibration parameters;
    identifying the second subset of RF circuit calibration parameters based on a dropout gradient descent network; and
    writing at least the first subset of RF circuit calibration parameters to a memory associated with the RF circuit.

2. The method of claim 1, further comprising verifying at least the first subset of RF circuit calibration parameters, wherein writing the at least the first subset of RF circuit calibration parameters to the memory associated with the RF circuit is performed after the verifying.

3. The method of claim 1, wherein the first subset of RF circuit calibration parameters and the second subset of RF circuit calibration parameters are different sets of RF circuit calibration parameters.

4. The method of claim 1, wherein identifying the second subset of RF circuit calibration parameters comprises:
- extracting pairwise correlations between parameters in a historical data set of RF circuit calibration parameters; and
- clustering the pairwise correlations into a plurality of clusters, each cluster of the plurality of clusters being associated with a plurality of parameters in the second subset of RF circuit calibration parameters and a parameter in the first subset of RF circuit calibration parameters.

5. The method of claim 1, wherein identifying the second subset of RF circuit calibration parameters comprises:
- for each respective pair of parameters including a first parameter and a second parameter in a historical data set of RF circuit calibration parameters:
- calculating a yield loss generated by calibrating the second parameter using a value of the first parameter; and
- generating a yield loss similarity value for the respective pair of parameters based on the calculated yield loss for the respective pair of parameters; and
- clustering pairwise correlations between each respective pair of parameters based on the yield loss similarity value for each respective pair of parameters.

6. The method of claim 1, wherein identifying the second subset of RF circuit calibration parameters comprises iteratively evaluating RF circuit calibration parameters to identify parameters having a yield loss less than a threshold value.

7. The method of claim 1, wherein:
- the dropout gradient descent network comprises a neural network; and
- identifying the second subset of RF circuit calibration parameters comprises, for each respective parameter of a universe of RF circuit calibration parameters:
- predicting other parameters in the universe of RF circuit calibration parameters with an identity connection for the respective parameter masked in the neural network;
- generating a candidate set of predictable parameters based on predicted parameters having a yield loss less than a threshold value; and
- refining the candidate set of predictable parameters based on a drop probability metric associated with each parameter in the candidate set of predictable parameters.

8. The method of claim 7, wherein generating the candidate set of predictable parameters comprises:
- assigning a weight for each respective parameter in the candidate set based on weights extracted from the neural network, wherein a weight for the respective parameter corresponds to an effect of the respective parameter on each target parameter;
- identifying a maximum weight for each respective parameter in the candidate set across a set of target parameters associated with the respective parameter; and
- initializing a drop probability value for each respective parameter based on a softmax function calculated over the maximum weight for each respective parameter in the candidate set.

9. The method of claim 7, wherein generating the candidate set of predictable parameters comprises generating the candidate set based on gradient descent optimization of a linear regression function over weights associated with each respective parameter in the candidate set.

10. The method of claim 1, wherein the second subset of RF circuit calibration parameters comprises RF circuit calibration parameters predictable with a yield loss less than a threshold value.

11. The method of claim 1, further comprising verifying the second subset of RF circuit calibration parameters.

12. The method of claim 11, further comprising, after verifying the second subset of RF circuit calibration parameters, writing the second subset of RF circuit calibration parameters to the memory associated with the RF circuit.

13. The method of claim 1, further comprising operating the RF circuit based on the second subset of RF circuit calibration parameters and the at least the first subset of RF circuit calibration parameters written to the memory associated with the RF circuit.

14. The method of claim 1, wherein the second subset of RF circuit calibration parameters comprises parameters associated with multiple-input, multiple-output (MIMO) techniques.

15. The method of claim 1, wherein the second subset of RF circuit calibration parameters comprises parameters associated with higher frequency bands than frequency bands associated with the first subset of RF circuit calibration parameters.

16. The method of claim 1, wherein the second subset of RF circuit calibration parameters comprises parameters associated with an increased number of uplinks and downlinks relative to the first subset of RF circuit calibration parameters.

17. The method of claim 1, wherein the second subset of RF circuit calibration parameters comprises power usage parameters.

18. The method of claim 1, wherein the second subset of RF circuit calibration parameters comprises parameters associated with controlling current biases in the RF circuit.

19. The method of claim 1, wherein the second subset of RF circuit calibration parameters comprises parameters for controlling voltages in the RF circuit.

20. A system for calibrating a radio frequency (RF) circuit, comprising:
- memory having executable instructions stored thereon; and
- one or more processors configured, individually or collectively, to execute the executable instructions in order to cause the system to:
- generate, based on a machine learning model and a first subset of RF circuit calibration parameters, values for a second subset of RF circuit calibration parameters;
- identify the second subset of RF circuit calibration parameters based on a dropout gradient descent network; and
- write at least the first subset of RF circuit calibration parameters to a memory associated with the RF circuit.

21. The system of claim 20, wherein the one or more processors are further configured, individually or collectively, to cause the system to verify at least the first subset of RF circuit calibration parameters, wherein the one or more processors are configured, individually or collectively, to write the at least the first subset of RF circuit calibration parameters to the memory associated with the RF circuit after the verifying.

22. The system of claim 20, wherein the first subset of RF circuit calibration parameters and the second subset of RF circuit calibration parameters are different sets of RF circuit calibration parameters.

23. The system of claim 20, wherein the second subset of RF circuit calibration parameters comprises RF circuit calibration parameters predictable with a yield loss less than a threshold value.

24. The system of claim 20, wherein the one or more processors are further configured, individually or collectively, to cause the system to verify the second subset of RF circuit calibration parameters.

25. The system of claim 24, wherein the one or more processors are further configured, individually or collectively, to cause the system to write, after verifying the second subset of RF circuit calibration parameters, the second subset of RF circuit calibration parameters to the memory associated with the RF circuit.

26. A method for calibrating a radio frequency (RF) circuit, comprising:
   generating, based on a machine learning model and a first subset of RF circuit calibration parameters, values for a second subset of RF circuit calibration parameters;
   identifying the second subset of RF circuit calibration parameters by iteratively evaluating RF circuit calibration parameters to identify parameters having a yield loss less than a threshold value; and
   writing at least the first subset of RF circuit calibration parameters to a memory associated with the RF circuit.

27. The method of claim 26, further comprising verifying at least the first subset of RF circuit calibration parameters, wherein writing the at least the first subset of RF circuit calibration parameters to the memory associated with the RF circuit is performed after the verifying.

28. The method of claim 26, wherein the first subset of RF circuit calibration parameters and the second subset of RF circuit calibration parameters are different sets of RF circuit calibration parameters.

29. A system for calibrating a radio frequency (RF) circuit, comprising:
   memory having executable instructions stored thereon; and
   one or more processors configured, individually or collectively, to execute the executable instructions in order to cause the system to:
   generate, based on a machine learning model and a first subset of RF circuit calibration parameters, values for a second subset of RF circuit calibration parameters;
   identify the second subset of RF circuit calibration parameters by iteratively evaluating RF circuit calibration parameters to identify parameters having a yield loss less than a threshold value; and
   write at least the first subset of RF circuit calibration parameters to a memory associated with the RF circuit.

30. The system of claim 29, wherein the one or more processors are further configured, individually or collectively, to cause the system to verify at least the first subset of RF circuit calibration parameters, wherein the one or more processors are configured, individually or collectively, to write the at least the first subset of RF circuit calibration parameters to the memory associated with the RF circuit after the verifying.

* * * * *